US006720707B2

(12) United States Patent
Tamai et al.

(10) Patent No.: US 6,720,707 B2
(45) Date of Patent: Apr. 13, 2004

(54) VIBRATION TYPE ACTUATOR

(75) Inventors: Jun Tamai, Yokohama (JP); Satoru Kitajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/864,265

(22) Filed: May 25, 2001

(65) Prior Publication Data

US 2002/0014811 A1 Feb. 7, 2002

(30) Foreign Application Priority Data

May 31, 2000 (JP) .......................... 2000-163627

(51) Int. Cl.[7] .......................... H01L 41/06; H01L 41/08
(52) U.S. Cl. .......................... 310/323.12; 310/323.01; 310/323.02; 310/325
(58) Field of Search .................. 310/323.01, 323.02, 310/323.12, 325

(56) References Cited

U.S. PATENT DOCUMENTS

| | | | | |
|---|---|---|---|---|
| 3,885,172 A | * | 5/1975 | Miller ........................ | 310/325 |
| 5,122,700 A | | 6/1992 | Tamai et al. ................ | 310/323 |
| 5,124,611 A | | 6/1992 | Tamai et al. ................ | 310/317 |
| 5,231,325 A | | 7/1993 | Tamai et al. ................ | 310/323 |
| 5,319,278 A | * | 6/1994 | Myohga et al. ......... | 310/323.12 |
| 5,506,462 A | | 4/1996 | Tamai et al. ................ | 310/328 |
| 5,574,326 A | | 11/1996 | Chiba et al. ................ | 310/323 |
| 5,594,291 A | | 1/1997 | Tamai et al. ................ | 310/323 |
| 5,600,196 A | | 2/1997 | Tamai ........................ | 310/323 |
| 5,684,353 A | | 11/1997 | Fujimoto et al. ............ | 310/323 |
| 5,739,623 A | * | 4/1998 | Kanazawa et al. ...... | 310/323.12 |
| 5,760,529 A | | 6/1998 | Tamai et al. ................ | 310/323 |
| 5,949,178 A | | 9/1999 | Tamai et al. ................ | 310/323 |
| 6,037,702 A | | 3/2000 | Tamai .................... | 310/323.06 |
| 6,084,335 A | | 7/2000 | Tamai .................... | 310/316.02 |
| 6,107,724 A | | 8/2000 | Tamai et al. ........... | 310/323.11 |
| 6,107,725 A | | 8/2000 | Tamai .................... | 310/323.11 |
| 6,140,741 A | * | 10/2000 | Tamai et al. ........... | 310/323.01 |
| 6,150,749 A | | 11/2000 | Tamai et al. ........... | 310/323.12 |

FOREIGN PATENT DOCUMENTS

| | | |
|---|---|---|
| JP | 3-11981 | 1/1991 |
| JP | 5-38170 | 2/1993 |

* cited by examiner

*Primary Examiner*—Nestor Ramirez
*Assistant Examiner*—J. Aguirrechea
(74) *Attorney, Agent, or Firm*—Fitzpatrick, Cella, Harper & Scinto

(57) ABSTRACT

A vibration type actuator has an elastic member in which a shaft center portion is formed in hollow shape along an axial direction and in which driving vibration is generated in a driving portion, a fastening member which fastens the elastic member to an electro-mechanical energy conversion element, an output shaft which penetrates the shaft center portion of the elastic member, a moving member which is kept in press contact with the driving portion of the elastic member and which rotates together with the output shaft, and a bearing member which is located between an inner periphery portion of the elastic member and a distal end portion of the fastening member and which journals the output shaft.

18 Claims, 11 Drawing Sheets

VIBRATION TYPE ACTUATOR

BACKGROUND OF THE INVENTION

1. Field of the Invention

The present invention relates to vibration wave (type) driving apparatus having an output shaft.

2. Related Background Art

Conventionally, several types of vibration motors are known as vibration wave driving apparatus having an output shaft. For example, as shown in FIG. 11, there is a known motor as disclosed in Japanese Patent Application Laid-Open No. 5-38170.

This motor has a vibration member 140 constructed in such structure that piezoelectric elements 142 and 144 are placed between metal blocks 150 and 152 as elastic members of hollow cylinder shape and that the two metal blocks are coupled by a coupling bolt 154 of cylindrical shape placed on the inner periphery side of these metal blocks 150, 152.

On the other hand, a motor housing (outer case) has a case body 170 and a lid 171 arranged at an opening end of the case body and provided with a motor support 171a of cylindrical shape located in a motor center region. This motor support 171a constitutes a motor supporting portion and a bearing 172 is placed on the motor support 171a and journals an output shaft 134. Further, a collar 175 of ring shape provided on a cylinder bore portion of the coupling bolt 152 is fixed to the motor support 171a to support the vibration member 140.

A rotating body (rotor portion) 130 as a contact body is placed on one side of the vibration member 140. This rotor portion 130 keeps a rotor body 132 of disc shape in press contact with an end face of the metal block 152 by spring force of spring 133. The spring 133 is placed between rotor body 132 and support plate 136 and the rotor body 132 is coupled to the output shaft 134.

In the above prior art example, however, since the bearing 172 is positioned by inserting it from one end of the motor support 171a of the lid 171 making the case, it is necessary to fix the bearing to the case by bonding or the like, in order to avoid slipping-off of the vibration member.

Accordingly, the vibration wave driving apparatus seems susceptible to further improvement in structure toward simpler fixing of the bearing for the output shaft and higher reliability without use of bonding.

SUMMARY OF THE INVENTION

One aspect of this invention is a vibration wave driving apparatus in which a bearing member journaling an output shaft is provided so as to be located between an inner periphery portion of an elastic member with a shaft center portion thereof being formed in hollow shape along an axial direction and a fastening member fastening this elastic member to an electro-mechanical energy conversion element, wherein the shaft center of the elastic member is determined by the output shaft journaled on the bearing member and wherein the bearing member is interposed between the elastic member and the fastening member, whereby the bearing member can be fixed more easily and surely without use of an adhesive or the like.

Another aspect of this invention is a vibration wave driving apparatus in which a bearing member journaling an output shaft is provided on an inner periphery portion of an elastic member with a shaft center portion being formed in hollow shape along an axial direction and near a distal end of a fastening member fastening the elastic member to an electro-mechanical energy conversion element, wherein the shaft center of the elastic member is determined by the output shaft journaled on the bearing member, whereby the fixing of the bearing member becomes much easier and higher in reliability.

DESCRIPTION OF THE PREFERRED EMBODIMENTS

First Embodiment

Figure 1:
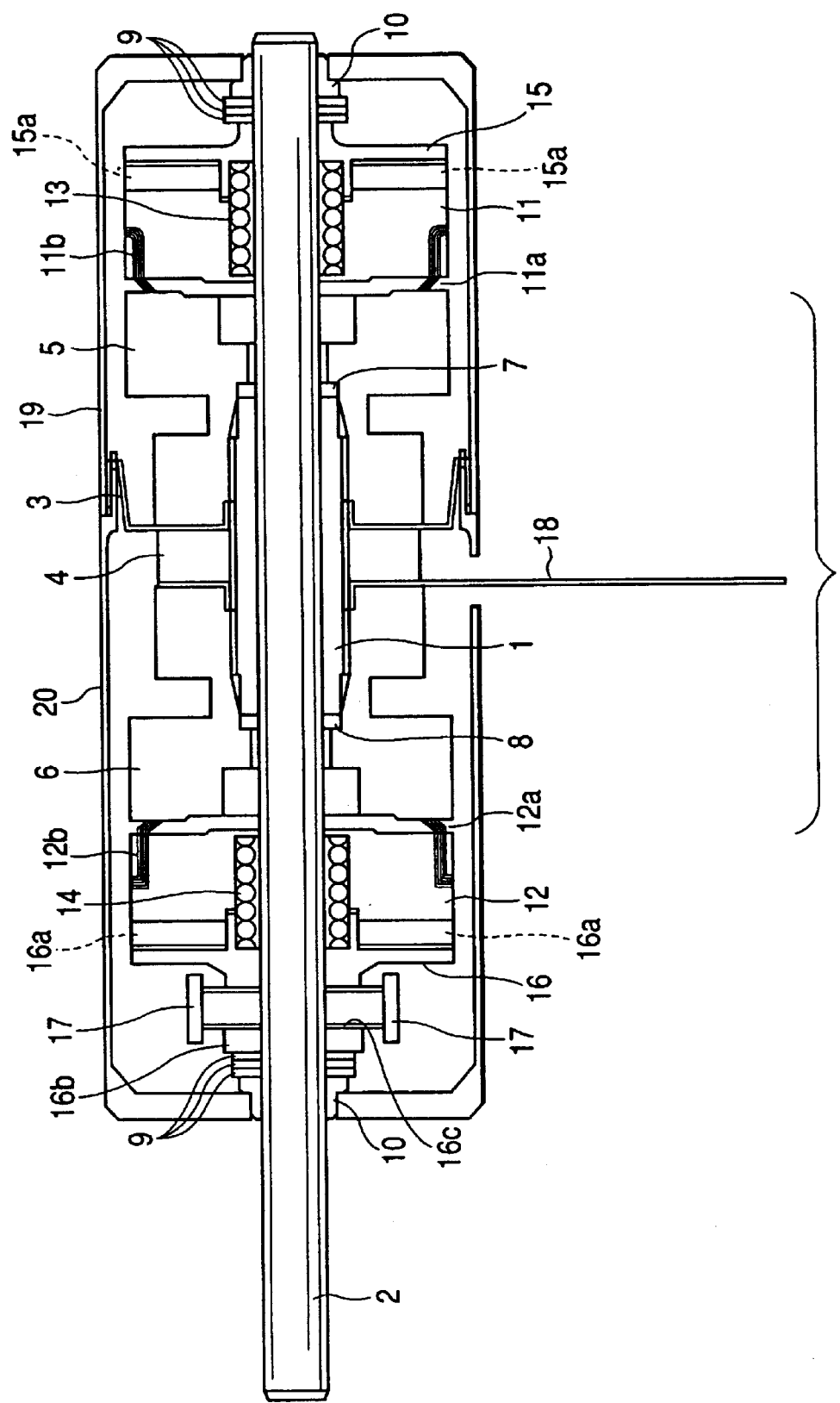
FIG. 1 is a cross-sectional view showing a first embodiment of the vibration wave driving apparatus according to the present invention.

FIG. 1 shows the first embodiment of the present invention.

FIG. 1 shows a cross-sectional view along the center axis of a vibration wave motor of bar shape as the vibration wave driving apparatus.

In the present embodiment a vibration member is constructed by placing a piezoelectric element (electromechanical energy conversion element) 4 of ring shape, a support 3 formed of a thin metal sheet, and a flexible printed wiring board 18 between two elastic members 5, 6 and fastening and fixing the two elastic members by a hollow bolt 1 of metal as a fastening member.

The vibration member of the present embodiment is a vibrator in which a driving signal being an alternating voltage is applied to the piezoelectric element 4 to induce two bending vibrations with a phase difference between them and the bending vibrations are combined to generate a circular or elliptic motion in a driving surface (frictionally driving surface). The principle of the driving is well known, for example, as described in Japanese Patent Application Laid-Open No. 3-011981 and the description thereof is thus omitted herein by incorporating the description in the Japanese application by reference.

In the present embodiment, however, there are two rotating members at the two ends of the vibration member, thereby yielding high torque efficiently.

Although the vibration member of the present embodiment is designed to provide the driving force by the composition of two bending vibrations, it may be one generating the circular or elliptic motion in the driving surface, for example, by composition of torsion and longitudinal vibration. An effect equivalent to that of the present invention is also achieved as long as the vibration wave driving apparatus is of a type wherein a hole is present in the shaft center portion of the vibration member (hollow central portion) and the output shaft penetrates the hole.

In the vibration wave driving apparatus of the present embodiment, the vibration member is in oscillatory motion like a skipping rope.

In the vibration member, vibration with two nodes is created along the axial direction by the vibration resulting from the composition of two bending vibrations, and bearings 7, 8 are located substantially at the respective node portions of this vibration. Since vibration displacements are very small at the mount portions of the bearings 7, 8 being substantially at the node positions of the vibration, they do not inhibit the vibration of the vibration member.

Since the bearings 7, 8 are interposed between two members so as to face the two ends of the hollow bolt 1 and cylinder bore portions of the elastic members 5, 6, the bearings can be readily fixed to the vibration member without use of an adhesive or the like. These bearings 7, 8 are made by cutting them out of a resin sheet.

A support member 3 consists of a sandwiched portion sandwiched between the piezoelectric element 4 and the elastic member 5 and a support portion located on the outside of this sandwiched portion and extending from the outer periphery of the elastic member 5. An outer periphery portion of the support member is sandwiched between engaging portions of cases 19, 20 of two-split structure, thereby supporting the vibration member in a floating state. This support portion of the support member 3 is located near an antinode of the vibration of the vibration member.

The support portion of the support member 3 makes a circular motion in the directions substantially normal to the shaft center of the vibration member. The amplitude of the motion of this support portion is extremely smaller than that of the driving surface, but only the small amplitude is not sufficient for firmly supporting and fixing the support portion. For that reason, the support member 3 is constructed as an elastic member of a thin plate so as to insulate the vibration here. This permits the vibration wave motor to be firmly fixed to the cases 19, 20.

As torque is generated in the output shaft 2, the support member 3 is subject mainly to torsion as reaction thereof. For this reason, the support member 3 is formed so as to be soft against the circular motion of the vibration member but rigid against the torsion.

In the vibration member of the present embodiment, there are few parts capable of firmly supporting the vibration member. Therefore, a plurality of support means are provided.

One of the plurality of support means is the aforementioned support member 3 and this support member 3 restrains rotation of the vibration member. The other support means are the bearings 7, 8 journaling the output shaft 2, spacers 9, and case bearings 10 in the present embodiment, wherein the bearings 7, 8 determine the shaft center of the vibration member and the spacers 9 and case bearings 10 restrain movement of the vibration member in the shaft center directions (thrust directions).

Rotors 11, 12 are arranged coaxially so as to face the driving portions of the elastic members 5 and 6. Each rotor 11, 12 has a portion of a small outside diameter on the opposed side to the elastic member 5, 6. A friction member 11a, 12a, which is made by forming three ring-shaped sheets from a thin sheet of martensitic stainless steel by press drawing and stacking them in fit with each other, is put on the outer periphery of the small diameter portion, and a clamping ring 11b, 12b is mounted on the outer periphery of each friction member 11a, 12a, thereby fixing the ring-shaped friction member 11a, 12a to the rotor 11, 12 by caulking. A portion of each frictional member 11a, 12a projecting from the rotor (a contact portion with the driving portion of the elastic member 5, 6) is drawn toward the center to be provided with a spring property and thereby yield a good following property to the driving vibration formed in the driving portion of the elastic member 5, 6.

After press working, the friction members 11a, 12a of stainless steel are improved in hardness by quenching and tempering treatments. With increase in the number of members making each friction member, the driving apparatus can be constructed with equivalent durability and higher torque.

On the other hand, it is necessary to strongly urge the rotating body against the vibration member in order to construct the driving apparatus of high torque. Since abrasion occurring in the friction portions is affected by the surface pressure on the friction surfaces, if the urging force is increased in the same area of the driving portion the abrasion of the friction members will increase and the durability of the motor will degrade.

On the other hand, if the thickness of the friction members is simply increased, the rigidity of the friction members will become considerably large. As a result, it can cause noise or slipping of the friction surfaces, so as to decrease the efficiency. Further, water can be condensed between the friction surfaces on the side of the elastic members 5, 6, so as to produce adhesion (attractive force), thereby leading to failure in activation of the driving apparatus.

Therefore, the present embodiment is adaptable for the high torque driving apparatus by providing the plurality of deformable pressed friction members in the independent structure.

For keeping the rotor 11, 12 in press contact with the vibrating member, i.e., for keeping the friction member 11a, 12a in press contact with the driving portion of the elastic member 5, 6, a press spring 13, 14 is placed in a cylinder bore portion of the rotor 11, 12, respectively. An outside end of each press spring 13, 14 in the axial direction is in contact with a detent member 15, 16 of disc shape provided at an outside end of the rotor 11, 12 in the axial direction, and the spring pressure can be altered by adjusting a clearance between the detent member 15, 16 and the elastic member 5, 6.

Each of the detent members 15, 16 is a member for transmitting the rotational force of the rotor 11, 12 being a rotating body, to the output shaft 2 and is press-fitted onto the output shaft 2 to be fixed in position. Of course, the detent members 15, 16 can be fixed to the output shaft 2 by a more secure method, such laser welding. Further, it is also preferable to provide the outer peripheral surface of the output shaft 2 with knurls or spline grooves and press-fit the detent members onto the output shaft 2. A clearance is provided for adjustment of pressure or the like between the end portion of the rotating body and the detent member.

In the present embodiment the detent member 15 has two claws 15a at two axially symmetric positions opposite to the rotor 11, 12, and the claws 15a fit in grooves in the end portion of the rotor 11, 12 to transmit the rotational force. In another conceivable configuration the claws 15a are provided on the rotor 11, 12 side. In still another conceivable configuration pins as separate members are press-fitted into the rotors or the detent members.

In one detent member 16 provided on the left side in FIG. 1, screw holes 16c are formed in axial symmetry in the direction perpendicular to the output shaft 2 and in a sleeve portion 16b on the spacer 9 side and set screws 17 are screwed into the screw holes 16c, whereby one detent member 16 can be fixed to the output shaft 2.

The motor can be disassembled later by unscrewing the set screws 17. The right case 19 and left case 20 secure the support member 3 in their engaging portions as described previously and hold the case bearings 10 at their respective ends.

Inside each bearing 10 spacers 9 are placed between the bearing and the detent member 15, 16, so as to prevent occurrence of play.

In the above structure, when a leftward force is imparted to the output shaft 2 in FIG. 1, the detent member 16 kept integral with the output shaft 2 by the set screws 17 comes to contact the spacer 9 whereby the leftward movement is restrained.

When a rightward force is imparted to the output shaft 2 in FIG. 1, the force is transmitted through the detent member 16 on the left side in the figure, press spring 14, rotor 12, friction member 12a, the vibration member, rotor 11, friction member 11a, rotor 11, and press spring 13 to the detent member 15, and the detent member 15 comes to contact the spacer 9 whereby further movement is restrained.

Since the side forces on the output shaft 2 cause no effect on the friction portions at all as described, the motor can provide stable output characteristics.

Figure 2:
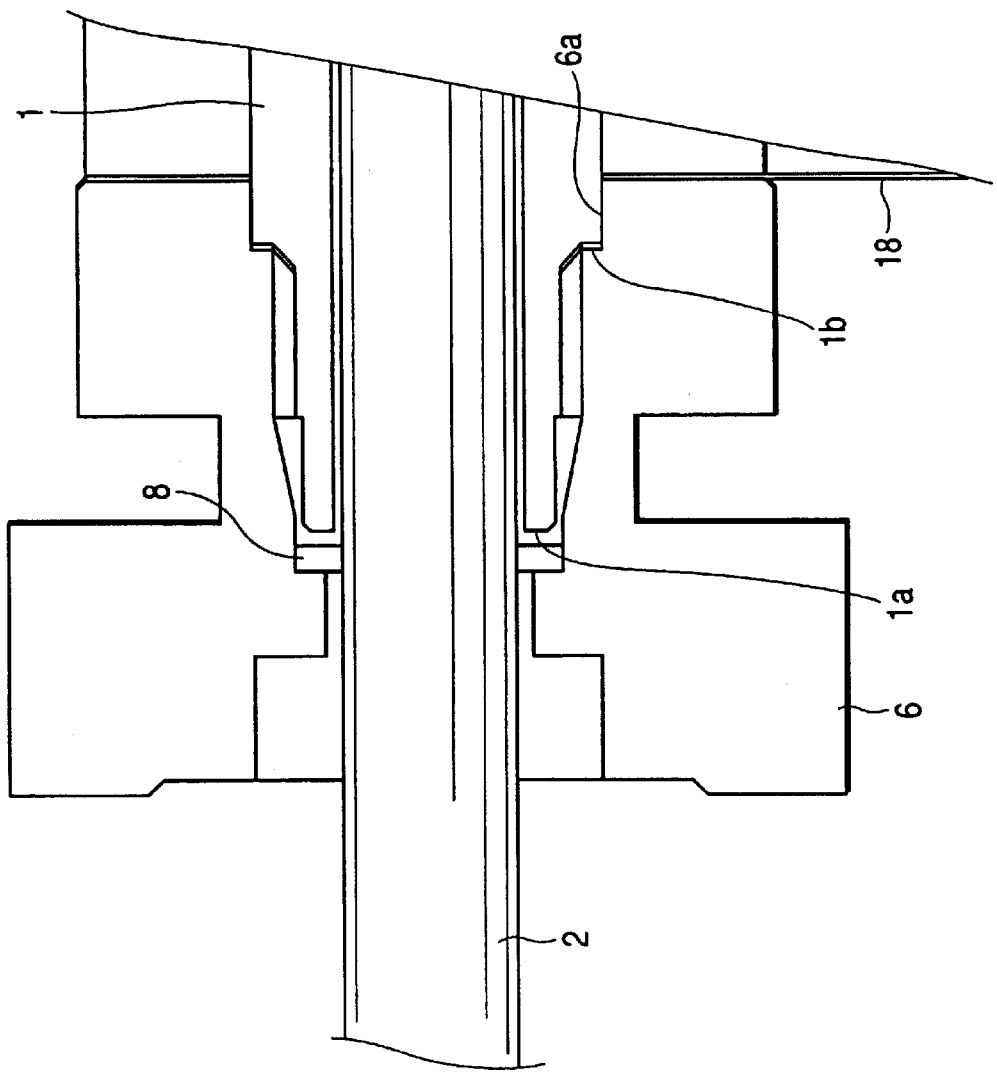
FIG. 2 is a partial, cross-sectional view of FIG. 1.

FIG. 2 is an enlarged view of the portion near one bearing shown in FIG. 1.

This bearing 8 is out of contact with the end 1a of the hollow bolt 1 but is in contact with the cylinder bore portion of the elastic member 6 only in a small area substantially at the node position of the vibration of the elastic member 6 while being out of contact with the other portions of the elastic member 6. There are two reasons why the bearing 8 is so out of contact.

The first reason is to prevent increase in internal loss (irreversible conversion from kinetic energy to energy, including that owned by materials themselves and also including friction loss occurring at interfaces of contact between materials) because of mutual slipping between the bearing 8 and the end 1a of the hollow bolt 1, or at a contact surface with the elastic member 6 during the vibration of the vibration member.

Since the bearing is normally made of a material having a generally high damping capacity of vibration, like polymer materials, the internal loss becomes large with deformation of the bearing due to the slipping.

The second reason is to prevent occurrence of the internal loss and noise due to vibration leak, by automatically moving the bearing to a smallest vibration position according to change of vibration modes. The bearing is located substantially at the node portion of the vibration member in design, as described above.

However, when the vibration member is subject to the frictional force from the friction member 12a of the rotor 12 in FIG. 1, the position of the node portion may vary slightly. In order to allow for this positional change, a clearance is provided between the bearing 8 and the end 1a of the hollow bolt 1, so that the bearing 8 can freely move even a little in the shaft center directions.

The means for providing the foregoing clearance between the bearing 8 and the end 1a of the hollow bolt 1 is composed of a butt portion 1b of the hollow bolt 1 and an inner-periphery-side step portion of the elastic member 6 in contact with the butt portion 1b.

At each of the two axial ends of the hollow bolt 1, three steps are formed in the outer periphery portion so as to decrease their outside diameters in order toward the outside end, a male thread portion is formed in the center, outer periphery portion having the intermediate outside diameter, and the step portion at the border between the center, outer periphery portion and the largest-diameter, outer periphery portion constitutes the aforementioned butt portion 1b. In the bore of the elastic member 6, inner periphery portions decreasing their inside diameters in order toward the outside end are formed corresponding to the outer periphery portions of the hollow bolt 1, and a female thread portion to mesh with the foregoing male thread portion of the hollow bolt 1 is formed in the center, inner periphery portion. The hollow bolt 1 is screwed into the elastic member 6 to mesh the male thread portion of the hollow bolt 1 with the female thread portion before a step between the center, inner periphery portion and the largest-inside-diameter, inner periphery portion adjacent thereto comes to contact the foregoing butt portion 1b. In this state, the aforementioned clearance is created between the distal end of the hollow bolt 1 and the bearing 8.

For constructing the vibration member, the piezoelectric element 4, the support member 3, and the flexible printed wiring board 18 having the function of supplying power to the piezoelectric element (and also having the function of extracting an output voltage generated by displacement of the piezoelectric element on the other hand) first need to be sandwiched and fixed all in close fit between the two elastic members 5, 6.

For that purpose, the members are preliminarily designed so as to make the clearance between the butt portion 1b of the hollow bolt 1 and either the elastic member 5 or the elastic member 6.

Then the entire length of the hollow bolt 1, the thrust dimensions of the interior of the elastic members 5, 6, and the thicknesses of the bearings 7, 8 are determined so as to keep the ends 1a of the hollow bolt 1 out of contact with the bearings 7 and 8 even with the butt portion 1b of the hollow bolt 1 butting against the inner periphery step of the elastic member 5 or 6.

In this embodiment, positional relations of the piezoelectric element 4, support member 3, and flexible printed wiring board 18 relative to the hollow bolt 1 are determined by engagement between the respective inside diameters of the piezoelectric element 4, support member 3, and flexible printed wiring board 18 and the outside diameter near the center of the hollow bolt 1.

Further, positional relations or center between the hollow bolt 1 and the elastic members are also determined by engagement between the outside diameter of the hollow bolt 1 and bore engaging portions 5a, 6a of the elastic members.

The present embodiment was described above as to a structure in which rotors were placed on both sides in the axial direction of the vibration member, but an apparatus of the present invention also may be of a type in which only one rotor is placed on one side of the vibration member. Further, the present embodiment showed the arrangement of two bearings in the vibration member, but the apparatus may also be constructed with one bearing.

Second Embodiment

Figure 3:
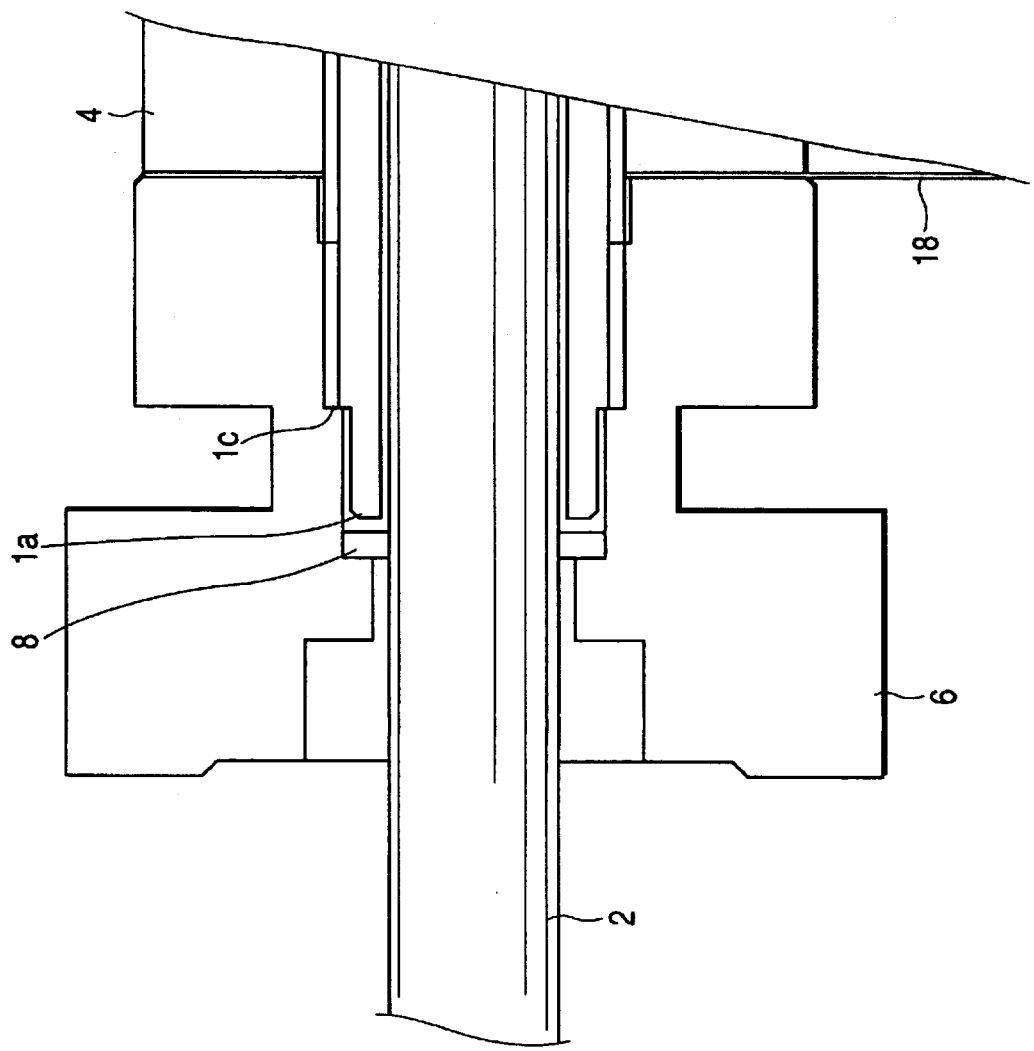
FIG. 3 is a partial, cross-sectional view showing a second embodiment of the vibration wave driving apparatus according to the present invention.

FIG. 3 shows the second embodiment.

FIG. 2 showed the structure wherein three-step outer periphery portions were formed at both ends of the hollow bolt 1, the male thread portion was formed in the center, outer periphery portion, the step between the center, periphery portion and the largest-diameter, outer periphery portion on the center side therefrom was made to contact the step formed in the inner periphery portion of the elastic member 6 to restrain further screwing, and the clearance was created between the bearing and the end of the hollow bolt 1; whereas the present embodiment provides a configuration in which a male thread portion is formed in the hollow bolt while leaving some length on the distal end sides. Then a butt portion 1c is provided as a distal end of the male thread portion of the hollow bolt 1 and the butt portion 1c comes to butt against a step portion formed in the inner periphery of the elastic member 6, thereby forming a clearance between the end 1a of the hollow bolt 1 and the bearing 8. In the embodiment shown in FIG. 2, however, a butt portion of the hollow bolt 1 on the other side (not shown) mostly butts against the cylinder bore portion of the elastic member 5 (which is not shown in FIG. 3 but shown in FIG. 1).

In the present embodiment, different from the first embodiment, the hollow bolt 1 is threaded near the center, so that the thread portion of the hollow bolt can be readily made by rolling. Namely, the thread portions at two positions as in the first embodiment necessitate two step of rolling and thus require more manhours, whereas the present embodiment provides a solution to this issue.

The rolling is superior in the following respects to cutting with a single-point tool and tapping; inexpensive working cost, capability of formation of high-strength screw thread, and permitting selection of high-strength alloy steel that can be hardened by quenching, not suitable for cutting, as the material for the bolt itself.

The aforementioned rolled bolt is particularly suitable for the hollow bolt 1 used in the motor of the present embodiment.

Third Embodiment

Figure 4:
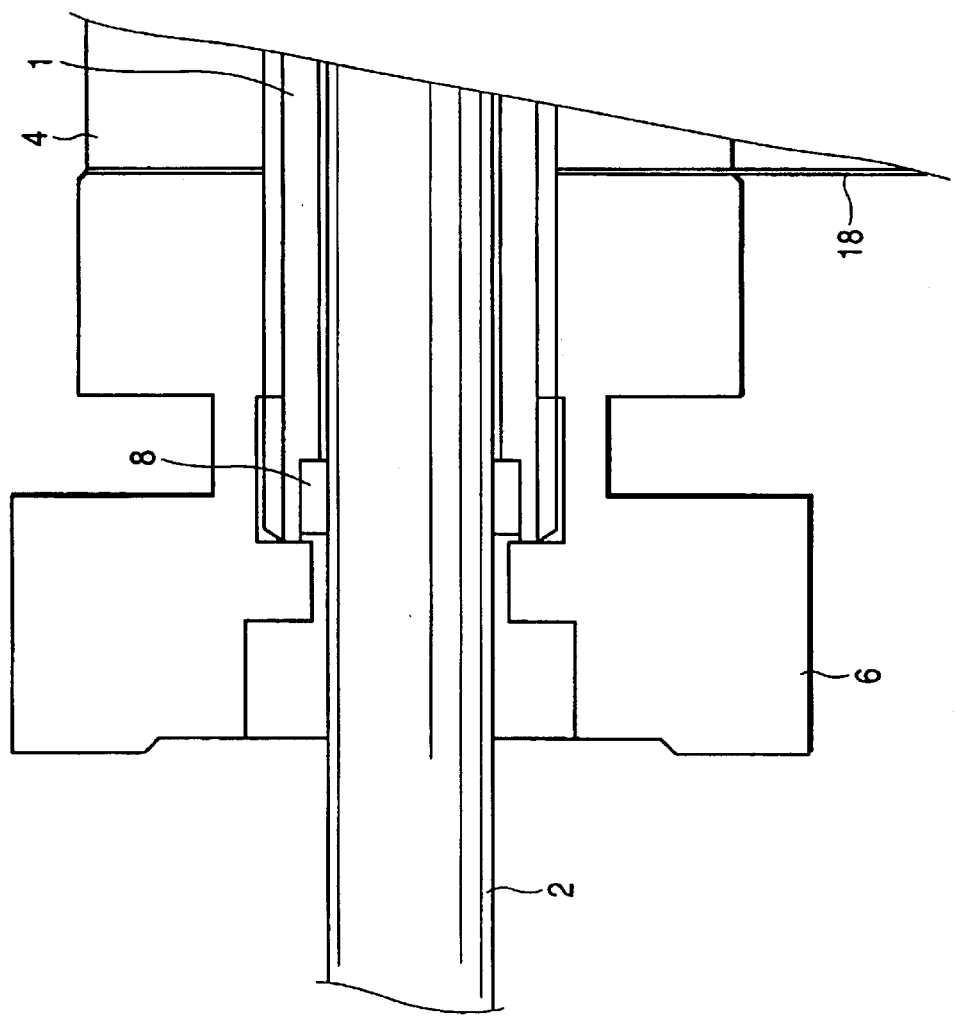
FIG. 4 is a partial, cross-sectional view showing a third embodiment of the vibration wave driving apparatus according to the present invention.

FIG. 4 shows the third embodiment.

The present embodiment is an example in which cylinder bore portions of a larger diameter are formed respectively at both ends on the internal periphery of the hollow bolt 1 having a uniform, outside diameter and in which the bearings 8 are provided on the cylinder bore portions of the large diameter. The vibration member can be assembled readily by preliminary engaging the bearings 8 with the hollow bolt 1.

Although not limited to the present embodiment, the cylinder bore portion of the bearing may become smaller after the engagement of the bearing. Therefore, in certain cases the inside diameter size is finished with a reamer before insertion of the output shaft into the bearing.

In such cases, after the hollow bolt is combined with the bearings, reaming is performed. This step is simpler than a step of carrying out the reaming after assembly of the vibration member, and this permits chips to be easily disposed of, thus reducing the risk of making dents or scratches on the parts.

If a polymer material having a small coefficient of friction remains on the frictionally driving portion, it can cause reduction of torque of the motor or irregular rotation.

For fixing the vibration member necessitating high plane accuracy in the friction surfaces and the like, it becomes necessary during reaming to pay extreme attention to prevention of dents or scratches or to prepare a complicated assembly system.

However, when the coaxiality needs to be enhanced between the shaft center of the vibration member and the holes of the bearings (=the shaft center of the output shaft), it is preferable to implement the foregoing reaming after the assembly of the vibration member to the contrary.

Fourth Embodiment

Figure 5:
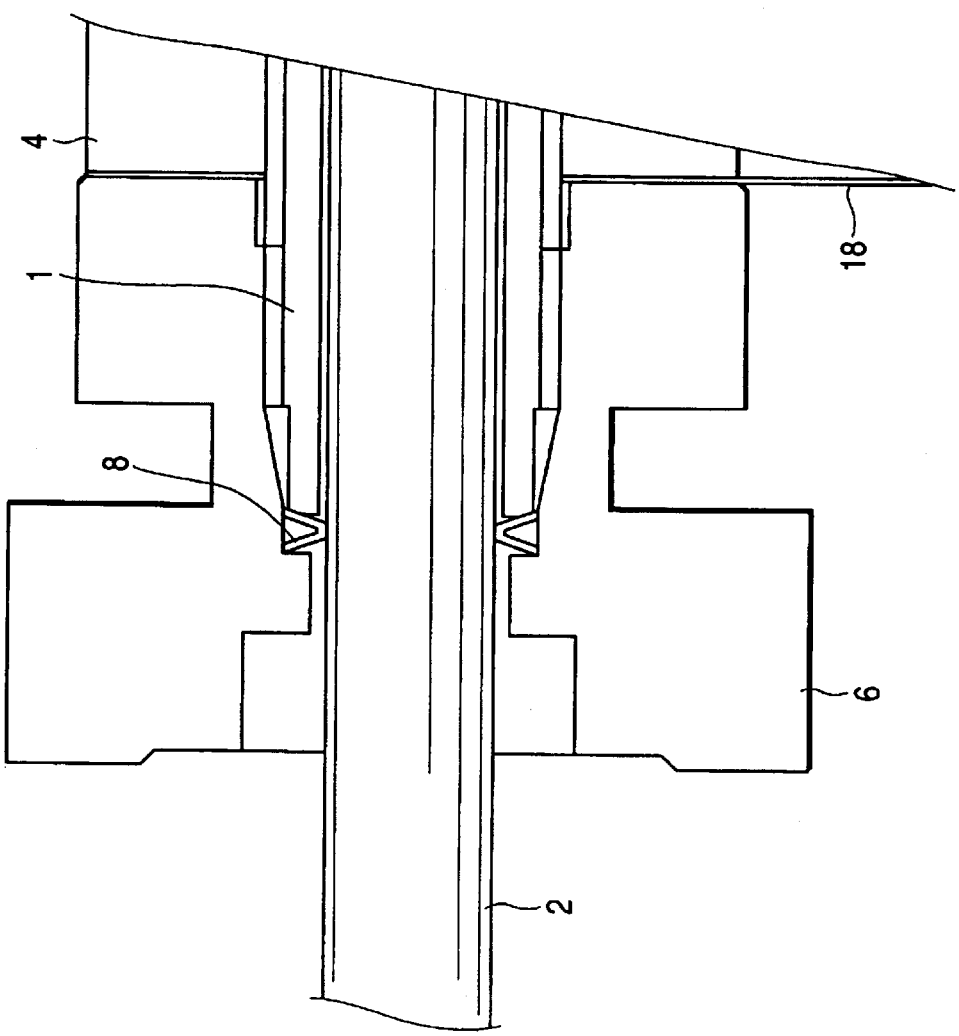
FIG. 5 is a partial, cross-sectional view showing a fourth embodiment of the vibration wave driving apparatus according to the present invention.

FIG. 5 shows the fourth embodiment.

In the present embodiment the hollow bolt 1 is the same as that shown in FIG. 3 and the present embodiment is different therefrom in that the bearing 8 is made of resin or rubber and a V-groove portion is formed along the circumferential direction in the outer periphery of the bearing. Then the bearing 8 has elasticity in the shaft center directions and is capable of elastic deformation. When the bearings 7, 8 are made of resin, they are made by cutting them out of a resin sheet.

In this structure, even if one end of the hollow bolt 1 first hits the bearing 8 because of a dimensional error in the thrust directions, the bearing 8 itself can elastically deform so as to ensure movement of the bearing 8, thereby maintaining the close fit of the two elastic members 5, 6 with the piezoelectric element 4, support 3, and flexible printed wiring board 18.

Since the bearing is interposed between the hollow bolt 1 and the elastic member 5, 6 and collapses in the shaft center directions to decrease the cylinder bore portion thereof in particular, the inner periphery of the bearing can tightly fit the output shaft 2.

Fifth Embodiment

Figure 6:
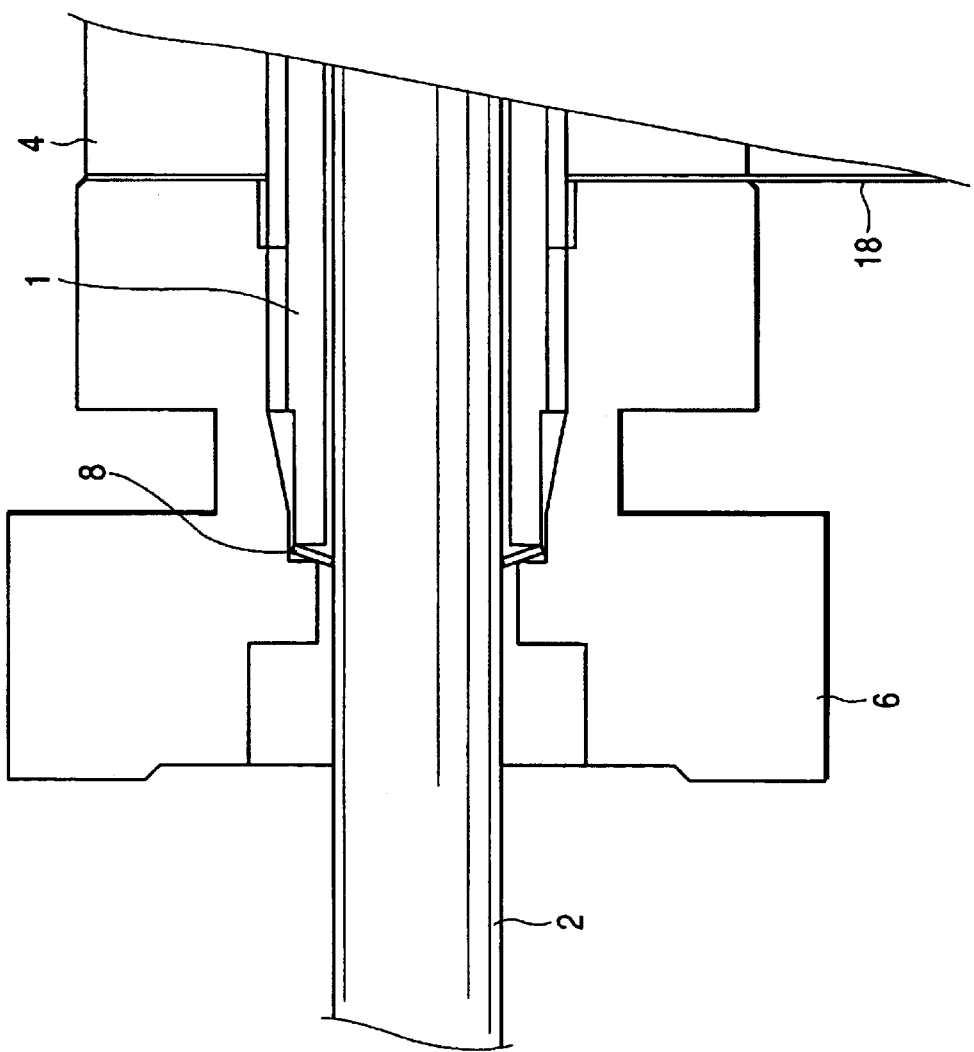
FIG. 6 is a partial, cross-sectional view showing a fifth embodiment of the vibration wave driving apparatus according to the present invention.

FIG. 6 shows the fifth embodiment.

In the above-mentioned embodiment shown in FIG. 5, the bearing 8 was made of resin or rubber to permit the axial, elastic deformation of the bearing 8 itself, whereas in the present embodiment the bearing 8 is formed in truncated cone shape of a spring member and the bearing thus functions just like a coned disc spring, so as to be elastically deformable in the axial direction. This configuration also provides the effect similar to that in the above embodiment. The bearing 8 in the present embodiment can be made readily by punching of a platelike blank.

Sixth Embodiment

Figure 7:
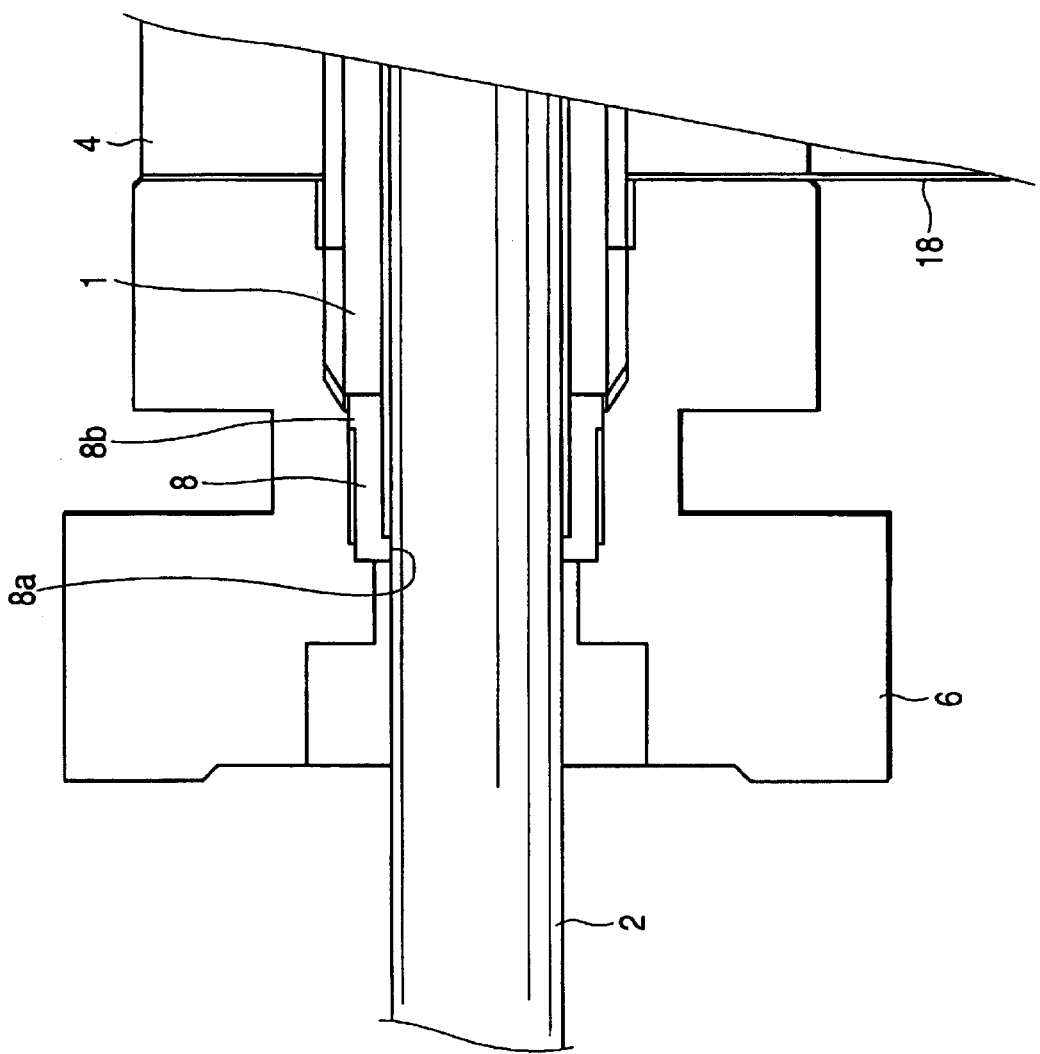
FIG. 7 is a partial, cross-sectional view showing a sixth embodiment of the vibration wave driving apparatus according to the present invention.

FIG. 7 shows the sixth embodiment.

In the present embodiment the bearing 8 is provided with an inner flange portion 8a for journaling the output shaft 2 in a small width, on the outer end side in the axial direction, and with an outer flange portion 8b on the other side for being journaled in a small width on the inner periphery of the elastic member 6. The inner periphery portion of the elastic member 6 is provided with a step portion engaging with the outside end of the bearing 8 to restrain displacement toward the outside in the axial direction.

The male thread portion is formed to the ends of the hollow bolt 1 and the hollow bolt 1 is screwed into the elastic member 6 until the distal end of the hollow bolt 1 goes into contact with the end of the bearing 8. In the present embodiment the bearing 8 is made of resin by injection molding, the inner flange portion 8a journals the output shaft 2, and the outer flange portion 8b is journaled on the elastic member 6 whereby the outer cylinder portion of the bearing 8 has a minimum area of contact with the elastic member, thereby minimizing the vibration leak and facilitating the press fitting work.

The contact area of the inner cylinder portion of the bearing 8 is also determined by a trade-off between vibration leak and abrasion.

In the present embodiment the entire length of the hollow bolt 1 can be shortened by the degree of increase in the entire length of the bearing 8. As a consequence, it is feasible to reduce the total cost of the bearing 8 and the hollow bolt 1.

Seventh Embodiment

Figure 8:
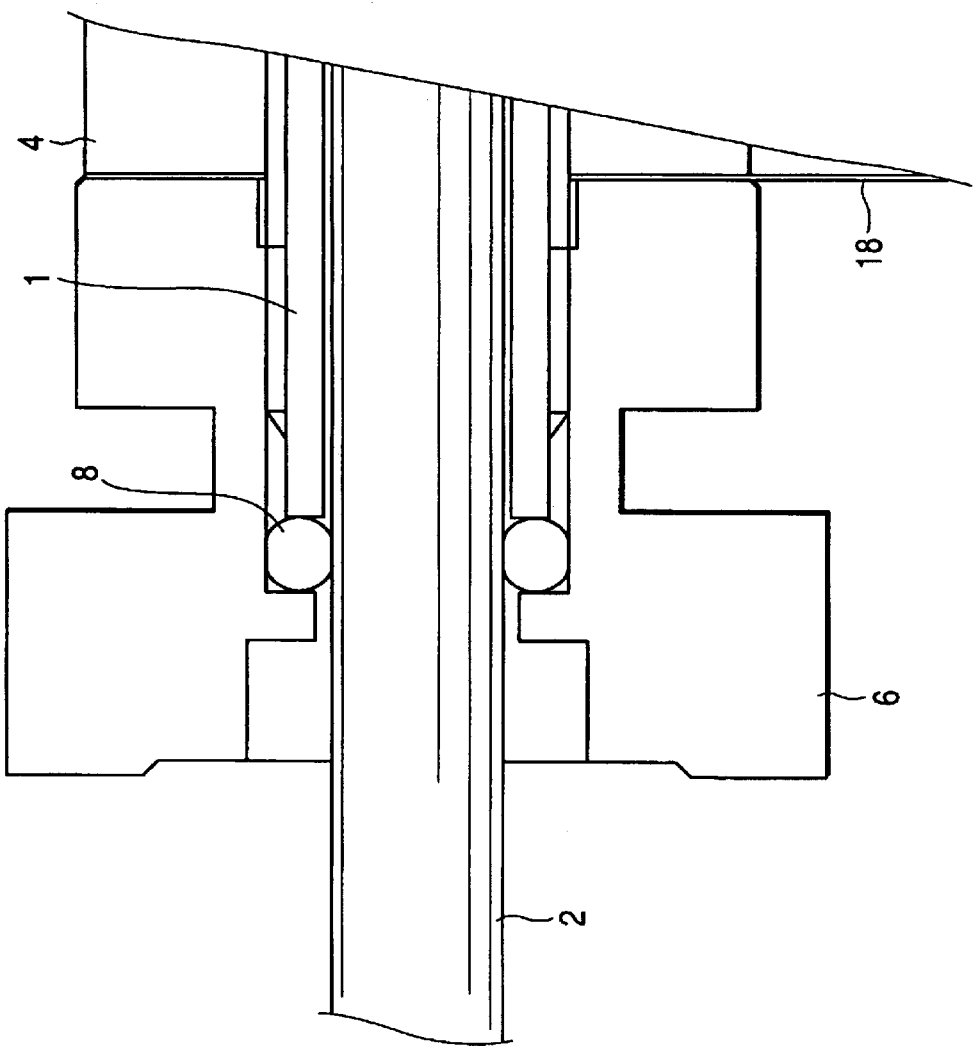
FIG. 8 is a partial, cross-sectional view showing a seventh embodiment of the vibration wave driving apparatus according to the present invention.

FIG. 8 shows the seventh embodiment.

In the present embodiment the bearing 8 is an O-ring made of rubber.

In the present embodiment, since the bearing 8 of the rubber O-ring is interposed between the output shaft 2 and the elastic member 6, it securely interrupts the vibration of the vibration member, so that there occurs little vibration leak to the output shaft 2.

The surface of the bearing 8 of O-ring is treated by a surface treatment with lubricity, e.g., fluororesin or the like, to reduce the friction loss of the bearing and thus reduce the rotational load on the output shaft 2.

Eighth Embodiment

Figure 9:
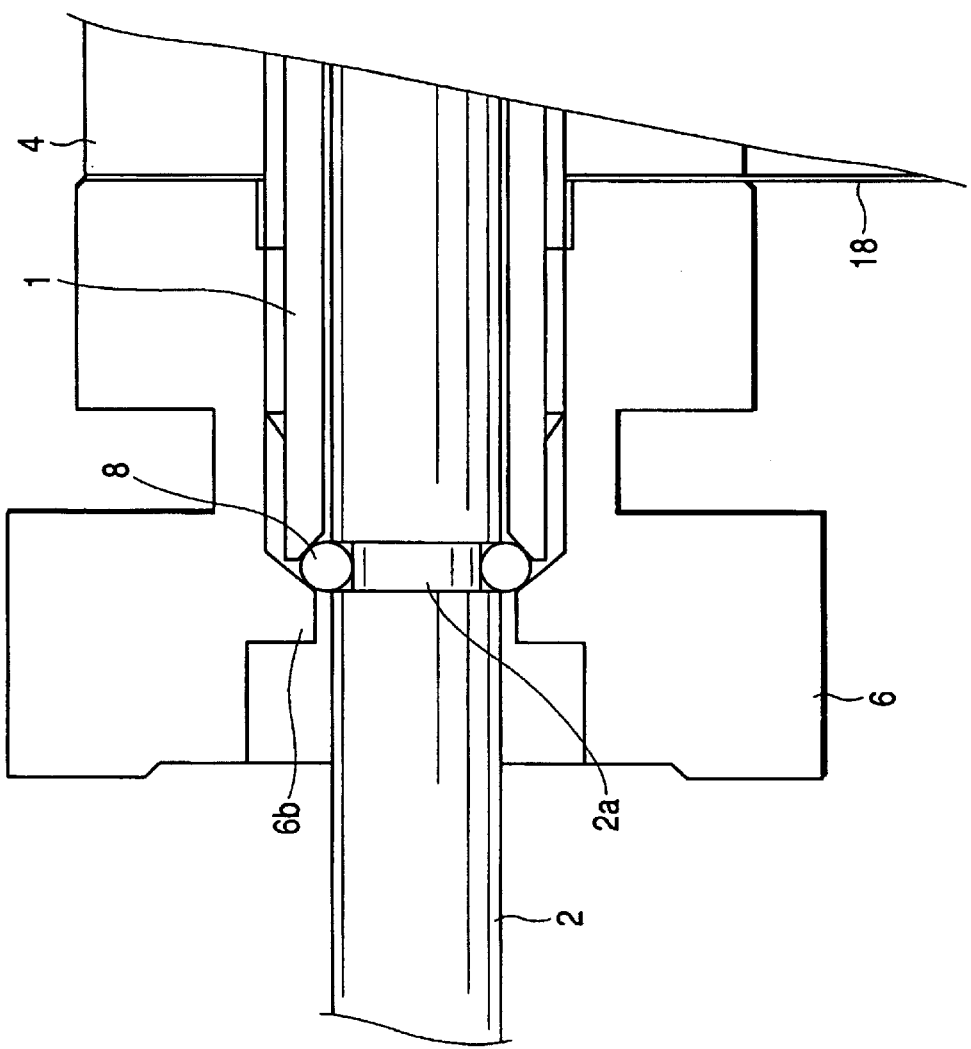
FIG. 9 is a partial, cross-sectional view showing an eighth embodiment of the vibration wave driving apparatus according to the present invention.

FIG. 9 shows the eighth embodiment.

In the present embodiment, a groove portion 2a is formed in the circumferential direction in the output shaft 2 and the bearing 8 of an O-ring, similar to that in the above embodiment, is fit in the groove portion 2a.

In the present embodiment, the O-ring as the bearing 8 is interposed in a V-shaped groove portion constructed of a slope portion of an inner flange portion 6b formed on the inner periphery of the elastic member and a slope portion of an end of the hollow bolt 1.

Therefore, the relative positions of the output shaft 2 and the vibration member are kept fixed even with application of a force to the output shaft 2 in the shaft center (thrust) direction.

For this reason, the present embodiment obviates the necessity for the spacers 9 in FIG. 1.

Namely, in the design in which the spacers 9 receive the force exerted in the axial direction of the output shaft 2, as shown in FIG. 1, torque loss occurs.

In other words, if the detent member 16 goes into close fit with the spacers 9 and case bearing 10 with exertion of the axial force, friction appears there and can reduce the torque generated by the motor.

Ninth Embodiment

Figure 10:
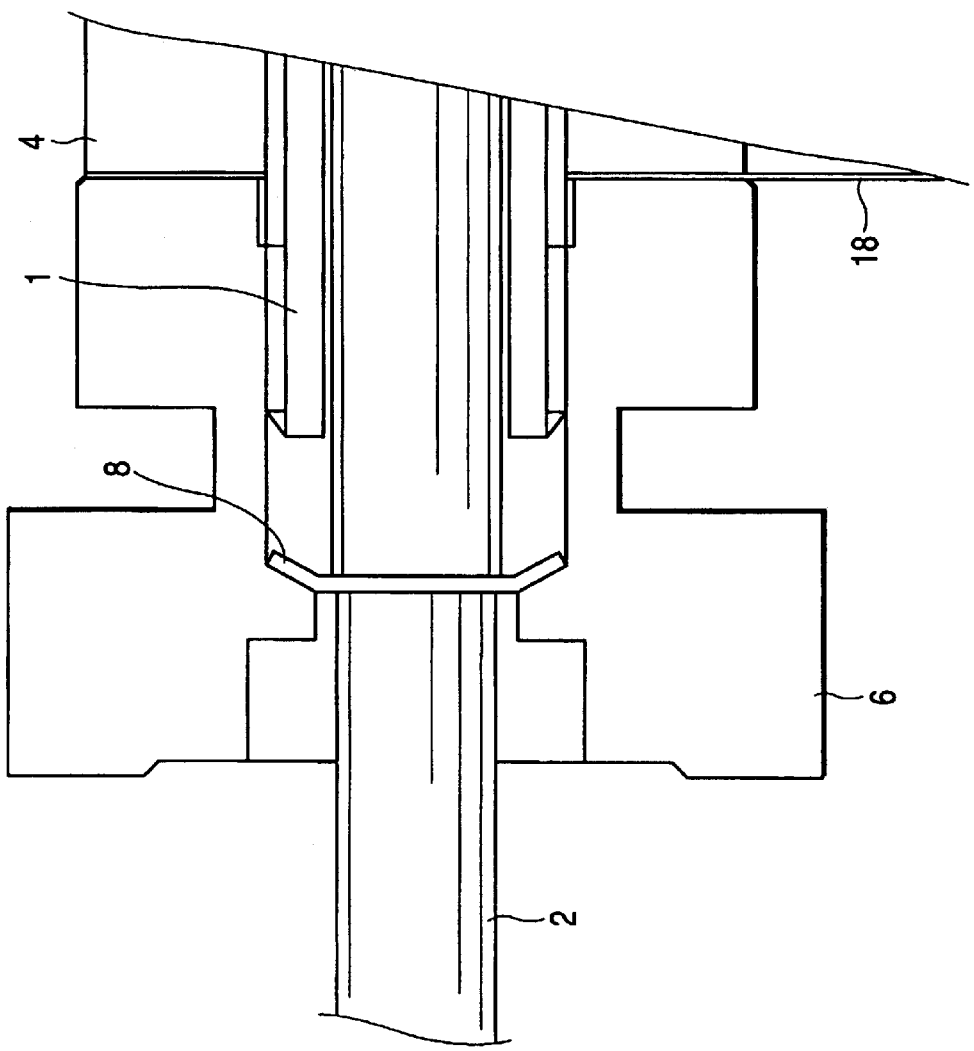
FIG. 10 is a partial, cross-sectional view showing a ninth embodiment of the vibration wave driving apparatus according to the present invention.
Figure 11:
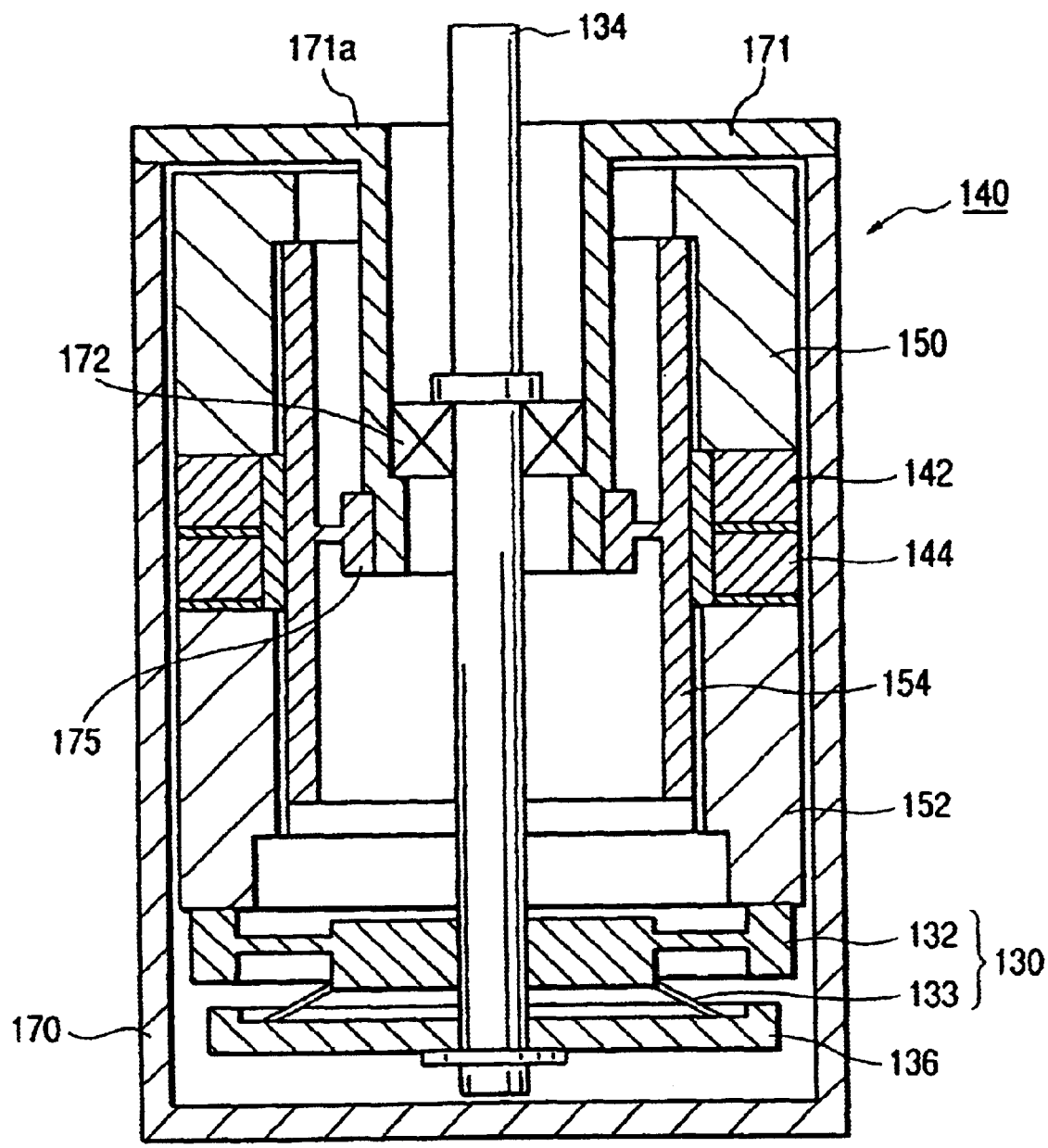
FIG. 11 is a cross-sectional view of the conventional vibration wave driving apparatus.

FIG. 10 shows the ninth embodiment.

The output shaft 2 is formed in stepped shape in a small diameter on the outer end side and in a large diameter on the inner side, and the bearing 8 is made by punching a resin sheet into washer shape by press working. The bearing 8 is set at the stepped portion so as to be urged against a cylinder-bore step portion of the elastic member 6.

The present embodiment is realized in the extremely simple structure and with application of the aforementioned axial force on the output shaft 2 this structure can resist the force.

What is claimed is:

1. A vibration type actuator comprising:
    an elastic member having a hollow central portion formed along an axial direction thereof, and a driving portion in which driving vibration is generated;
    a fastening member located on an inner periphery portion of said elastic member, which fastens said elastic member to an electro-mechanical energy conversion element;
    an output shaft which penetrates the hollow central portion of said elastic member;
    a moving member in press contact with the driving portion of said elastic member, and which rotates together with said output shaft; and
    a bearing member located between said elastic member and said fastening member and which journals said output shaft.

2. A vibration type actuator according to claim 1, wherein said bearing member has one surface facing said fastening member and another surface opposite thereto facing said elastic member.

3. A vibration type actuator according to claim 1, wherein said bearing member can move by a fixed distance along the axial direction.

4. A vibration type actuator according to claim 1, wherein said bearing member can move in the axial direction between said elastic member and said fastening member.

5. A vibration type actuator according to claim 1, wherein said output shaft is restrained from slipping off outward in the axial direction.

6. A vibration type actuator according to claim 1, wherein said fastening member is a hollow thread member which has a thread portion formed in an outer periphery portion and wherein said elastic member has a step which restrains a screwing position of said fastening member, in the inner periphery portion thereof.

7. A vibration type actuator according to claim 1, wherein said bearing member is deformable in a direction of a shaft center of said output shaft.

8. A vibration type actuator according to claim 1, wherein said bearing member is deformable in the axial direction of said output shaft.

9. A vibration type actuator according to claim 1, wherein said bearing member has a groove portion formed along an outer circumferential direction in an outer periphery portion.

10. A vibration type actuator according to claim 1, wherein said bearing member is an O-ring.

11. A vibration type actuator according to claim 1, wherein said bearing member is made of resin or rubber.

12. A vibration type actuator according to claim 1, wherein said output shaft has a groove or a step in an outer periphery portion thereof and said bearing member is placed at a position of the groove or the step.

13. A vibration type actuator according to claim 1, wherein said bearing member is placed substantially at a node position of the vibration of said elastic member.

14. A vibration type actuator comprising:
    a plurality of elastic members each having a hollow central portion formed along an axial direction thereof, and a driving portion in which driving vibration is generated;

an electro-mechanical energy conversion element interposed between said plurality of elastic members;

a fastening member having a hollow central portion formed along an axial direction thereof, said fastening member being located on an inner periphery portion of said plurality of elastic members and fastening said plurality of elastic members to said electro-mechanical energy conversion element;

an output shaft which penetrates the central portions of said plurality of elastic members and which is restrained from slipping off outward in an axial direction;

a plurality of moving members, respectively in press contact with the driving portions of said plurality of elastic members and which rotate together with said output shaft; and at least one bearing member respectively located between one of said plurality of elastic members and a respective end portion of said fastening member and which journals said output shaft.

15. A vibration type actuator according to claim 14, wherein said at least one bearing member has one surface facing said fastening member and another surface opposite thereto facing one of said plurality of elastic members.

16. A vibration type actuator according to claim 14, wherein said at least one bearing member can move by a fixed distance along said axial direction.

17. A vibration type actuator according to claim 14, wherein said at least one bearing member can move in the axial direction between one of said plurality of elastic members and said fastening member.

18. A vibration type actuator according to claim 14, wherein a moving distance of said at least one beating member in the axial direction is restrained by an inner periphery portion of one of said plurality of elastic members and said fastening member.

* * * * *

UNITED STATES PATENT AND TRADEMARK OFFICE
CERTIFICATE OF CORRECTION

PATENT NO. : 6,720,707 B2
DATED : April 13, 2004
INVENTOR(S) : Jun Tamai et al.

It is certified that error appears in the above-identified patent and that said Letters Patent is hereby corrected as shown below:

Column 5,
Line 26, "occurrence" should read -- the occurrence --.

Column 7,
Line 59, "preliminary" should read -- preliminarily --.

Column 12,
Line 15, "beating" should read -- bearing --.

Signed and Sealed this

Sixteenth Day of November, 2004

JON W. DUDAS
*Director of the United States Patent and Trademark Office*